No. 746,435. PATENTED DEC. 8, 1903.
H. ANDREWS.
INSECT TRAP.
APPLICATION FILED JUNE 24, 1903.
NO MODEL.

WITNESSES:
Edwin F. McKee
John F. Byrne

INVENTOR
Harry Andrews
BY Victor J. Evans
Attorney

No. 746,435. Patented December 8, 1903.

UNITED STATES PATENT OFFICE.

HARRY ANDREWS, OF LANCASTER, PENNSYLVANIA.

INSECT-TRAP.

SPECIFICATION forming part of Letters Patent No. 746,435, dated December 8, 1903.

Application filed June 24, 1903. Serial No. 162,926. (No model.)

*To all whom it may concern:*

Be it known that I, HARRY ANDREWS, a citizen of the United States, residing at Lancaster, in the county of Lancaster and State of Pennsylvania, have invented new and useful Improvements in Insect-Traps, of which the following is a specification.

My invention relates to insect-traps; and the primary object thereof is to provide a new and useful device of this character adapted to automatically reset itself and which will be easy of operation, cheap of construction, durable, and efficient.

Further objects of the invention will appear as the nature of the same is more fully understood from the following description and accompanying drawings.

The invention consists in the construction, combination, and arrangement of parts hereinafter fully described, claimed, and illustrated in the accompanying drawings, in which—

Figure 1:
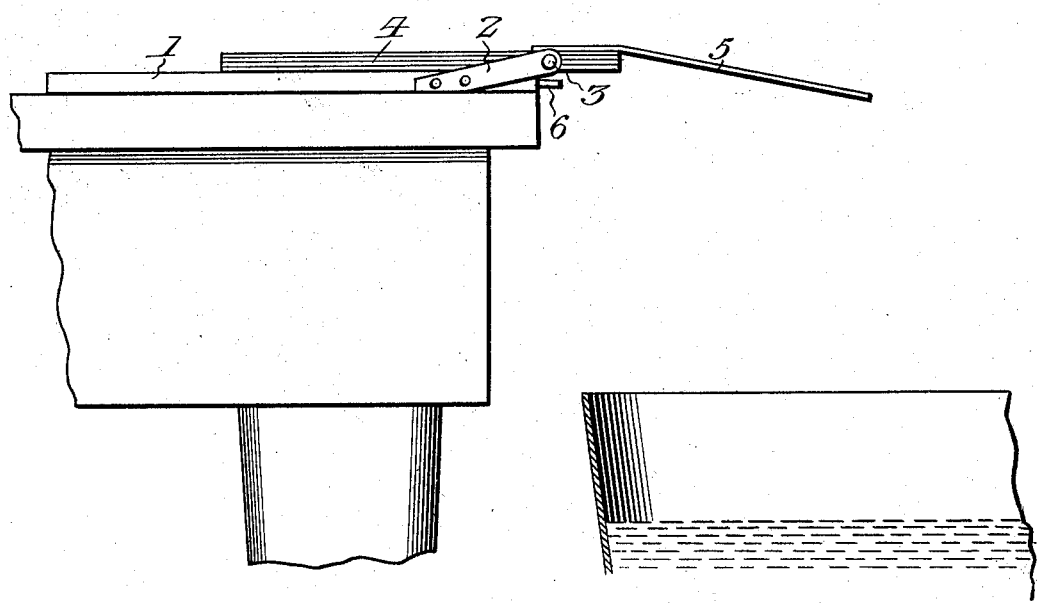
Figure 2:
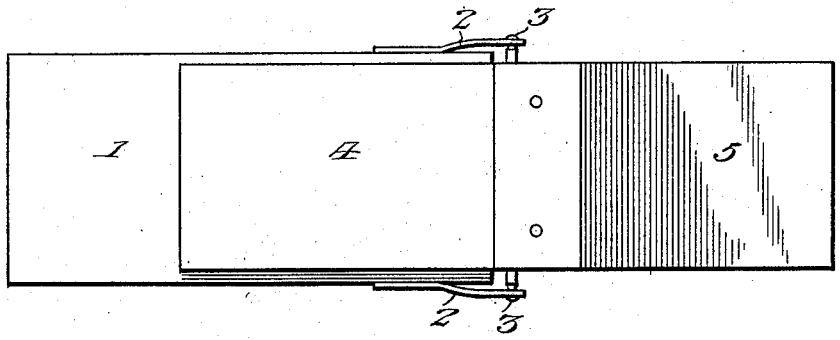

Figure 1 is a side elevation of the trap in applied position upon a table above a receptacle of fluid. Fig. 2 is a top plan view of the trap.

Referring to the drawings by reference-numerals, 1 designates a base-plate preferably rectangular in contour and of a weight sufficient to retain the trap in applied position without the necessity of using other fastening means.

2 2 designate arms, each being provided at a point near one of their ends with a depression forming a bearing 3 and are secured to the edges of the base-plate in such position that the bearings 3 will be disposed a little above the base-plate and in advance of the forward end thereof.

Mounted upon the base to have a tilting movement thereon is a platform, the same being provided at points to one side of its center with pintles 5, having their extremities, which are adapted to be received by the bearings to fulcrum the platform upon the base-plate, reduced to needle-points to reduce the friction between the bearings and pintles to a minimum in order that the weight of an insect may easily tilt the platform. The platform consists of two members—a main member 4, which may be constructed of wood of a weight sufficient to nominally retain the platform in a horizontal or set position, and a secondary member 5, which may be constructed from metal or any other material having a hard smooth face. The member 5 is secured to the member 4 in any suitable manner and has its greater portion bent downwardly to give to its upper smooth face an inclination, through virtue of which all liability of an insect securing a grip and moving upward upon said member beyond its center of gravity, and consequently rendering the trap inoperative, is obviated. The base has its forward end provided with a projection 6, adapted to be engaged by the member 4 when tilted to obviate any liability of the platform being moved to a vertical position to insure its quick return to its normal horizontal position.

The operation of the trap may be explained in the following manner: The device may be placed upon a table or other support to dispose the member 5 above and over a receptacle of fluid, as clearly illustrated in Fig. 1 of the drawings. In this position of the trap any insect that may crawl onto the member 5 will cause the platform to be tilted and, owing to the smooth face and inclination of this member, the insect will be precipitated into the receptacle of fluid. After the weight of the insect has been removed from the member 5 the platform will be caused to immediately resume its normal horizontal position through virtue of the greater weight of the member 4.

It is apparent from the above description, taken in connection with the accompanying drawings, that the means of securing the platform to the base-plate provides one that is easily tilted and returned to its normal position and that through virtue of the smooth and inclined face of the member 5 the operation of the trap is greatly facilitated, and all liability of an insect escaping after once being on the member 5 is obviated. It may also be said that by increasing the size of the several elements of the trap it can be used as an animal-trap.

Having thus described the invention, what is claimed as new is—

1. The combination with a base-plate; of arms secured thereto at an angle to dispose their forward ends above and in advance of the forward end of the base-plate, said forward ends being provided with depressed bearings, a platform, pintles carried by the platform and having needle-points adapted to be received by the bearings, and a projection carried by the forward end of the base-plate to prevent the platform being tilted beyond a vertical position.

2. The combination with a base-plate, of arms secured thereto and having their forward ends disposed in advance of the base-plate and provided with depressed bearings, a platform comprising main and secondary members, the main member being adapted to retain the platform in its normal horizontal position, the secondary member being secured to the main member and having its greater portion bent downwardly, pintles carried by the platform and having needle-points to be received by the bearings, and a projection carried by the forward end of the base-plate to prevent the platform being titled to a vertical position.

In testimony whereof I affix my signature in presence of two witnesses.

HARRY ANDREWS.

Witnesses:
C. F. STOVER,
B. F. MUSSER.